United States Patent [19]

Muromachi et al.

[11] Patent Number: 5,336,565
[45] Date of Patent: Aug. 9, 1994

[54] AUTOMOTIVE WINDOW GLASS

[75] Inventors: Takashi Muromachi, Kawasaki; Jun Kawaguchi, Yokohama; Hidemi Nakai, Tsukuba, all of Japan

[73] Assignee: Nippon Sheet Glass Co., Ltd., Osaka, Japan

[21] Appl. No.: 91,469

[22] Filed: Jul. 13, 1993

Related U.S. Application Data

[63] Continuation of Ser. No. 837,158, Feb. 18, 1992, abandoned.

[30] Foreign Application Priority Data

Feb. 28, 1991 [JP] Japan .................. 3-058186

[51] Int. Cl.$^5$ ............................................. B32B 15/04
[52] U.S. Cl. .................................. 428/432; 359/359;
428/336; 428/426; 428/433; 428/434; 428/437;
428/469; 428/472; 428/698
[58] Field of Search ............... 428/698, 432, 426, 437,
428/913, 336, 434, 433, 469, 472; 359/359

[56] References Cited

U.S. PATENT DOCUMENTS

| | | | |
|---|---|---|---|
| 3,682,528 | 8/1972 | Apfel et al. | 359/359 |
| 3,885,855 | 5/1975 | Gross | 359/359 |
| 4,045,125 | 8/1977 | Farges | 359/359 |
| 4,450,201 | 5/1984 | Brill et al. | 428/698 |
| 4,465,736 | 8/1984 | Nishihara et al. | 428/334 |
| 4,543,841 | 8/1985 | Hartig et al. | 428/426 |
| 4,844,985 | 7/1989 | Pharms et al. | 428/432 |
| 4,855,186 | 8/1989 | Grolig et al. | 428/437 |
| 4,861,669 | 8/1989 | Gillery | 428/432 |
| 4,973,511 | 11/1990 | Farmer et al. | 428/426 |

FOREIGN PATENT DOCUMENTS 2057355  4/1981  United Kingdom .

OTHER PUBLICATIONS

Valkonen et al "Optical Constants of thin silver and titanium nitride films" SPIE, vol. 652 Thin Film Technologies 11 (1986) pp. 235-242.

Francois et al "Reflectivity of ScN$_x$ Thin Films: Comparison With TiN$_x$, TiN$_x$C$_y$ and ZrN$_x$ Coatings and Application to the Photothermal Conversion of Solar Energy" Thin Solid Films, 127, 1985, pp. 205-214.

Valkonen et al "Selective transmission of Thin TiN-Films" SPIE Int. Soc. Opt. Eng. 1983 pp. 375-380.

Primary Examiner—A. A. Turner
Attorney, Agent, or Firm—Woodcock Washburn Kurtz Mackiewicz & Norris

[57] ABSTRACT

In an automotive window glass having a pair transparent sheet glasses that are stuck to each other with a transparent resin film, the inner surface of one of the pair of sheet glasses, which faces the transparent resin film, is coated with a heat-ray intercepting film that is composed of any one of the following chemical formulas whose atomic ratios are defined.

(A) $ZrN_xO_y$: $0.5 \leq x \leq 0.8$, and $0.8 \leq x+y \leq 1.2$
(B) $TiN_xO_y$: $0.2 \leq y \leq 0.8$, and $1.4 \leq x+y \leq 1.8$
(C) $CrN_xO_y$: $0.1 \leq y \leq 0.8$, and $1.4 \leq x+y \leq 1.8$ 7 Claims, 2 Drawing Sheets

AUTOMOTIVE WINDOW GLASS

This is a continuation of application Ser. No. 07/837,158, filed Feb. 18, 1992 now abandoned.

BACKGROUND OF THE INVENTION

1. Field of the Invention

This invention relates generally to an automotive window glass, and particularly, but not exclusively, to an automotive window glass with a film for screening the inside of a car from solar radiation; and an antenna conductor.

2. Description of Related Art

Recently, there is a tendency that automotive window glasses increase in area, whereby solar radiation energy is given more in the inside of a car. Thus, the inside is air-conditioned to prevent it from a rise in temperature, and in order to reduce a cooling load, a film for screening the inside from the solar radiation has been used so far.

Moreover, in the automotive window glass, particularly in a windshield, it is required, from a security viewpoint, to use a laminated glass that transmits 70 percent or more of visible light, and it is also required, from a designing viewpoint, that if the glass is coated with a heat-ray intercepting film, the appearance of such glass is not so much different in color from that of a glass having no heat-ray intercepting film: the glass should appear nearly achromatic like the glass having no heat-ray intercepting film, and should be prevented from dazzling reflections of light.

It is further required that the radio waves radiating and receiving characteristics of antennas for a portable telephone or a global positioning system (GPS) set in the inside of the car, or the receiving characteristics of antenna conductors secured to the outer surface of the automotive window glass is not damaged due to a heat-ray intercepting film sandwiched in between laminated glasses of the automotive window glass. One example of the latter is disclosed in Japanese Laid Open Patent No. 177601/1990, in which the heat-ray intercepting film is made of chromium oxynitride ($CrN_xO_y$) or titanium oxynitride ($TiN_xO_y$), and it is reported that the antenna sensitivity was not damaged at all.

However, the disclosed automotive window glass is such that a surface of a single sheet glass is covered with a chromium or titanium oxynitride film. It is, therefore, not a laminated glass having a heat-ray intercepting film, and does not appear nearly achromatic, so that it is not usable for the car.

OBJECTS AND SUMMARY OF THE INVENTION

Accordingly, it is an object of the present invention to provide an automotive window glass which does not dazzle in light so as to match its color to that of a car, and screens the inside of the car from solar radiation so as to reduce a load for cooling the inside.

Another object of the invention is to provide an automotive window glass in which if an antenna is secured thereto, the radio waves receiving characteristic of the antenna is not damaged by a heat-ray intercepting film used therewith.

A further object of the invention is to provide an automotive window glass in which if an antenna is provided in the inside of a car, the radio waves radiating and receiving characteristic of the antenna is not damaged by a heat-ray intercepting film used therewith.

In accordance with an aspect of this invention, in an automotive window glass comprising a pair of transparent sheet glasses and a transparent resin film with which the pair of sheet glasses are stuck together, the window glass further comprises a second film sandwiched between one of said pair of sheet glasses and the transparent resin film so as to screen the inside of a car from solar radiation, the second film having any one of the following compositions represented by chemical formulas with which atomic ratios are defined.

(A) $ZrN_xO_y$: $0.5 \leq x \leq 0.8$ and, $0.8 \leq x+y \leq 1.2$
(B) $TiN_xO_y$: $0.2 \leq y \leq 0.8$ and, $1.4 \leq x+y \leq 1.8$
(C) $CrN_xO_y$: $0.1 \leq y \leq 0.8$ and, $1.4 \leq x+y \leq 1.8$ When in Formula A, x is, and in formulas B and C, y are larger than 0.8, the characteristic of the heat-ray intercepting film deteriorates, and the window glass becomes so yellowish as not to be suitable for the car. When in Formula A, x is smaller than 0.5; in Formula B, y is smaller than 0.2; and in Formula C, y is smaller than 0.1, the film characteristic deteriorates, the absorption of visible light becomes high, whereby the window glass becomes not transparent enough, and the sheet resistivity becomes small, whereby it is impossible to obtain such a window glass as to be transparent enough, to have a good heat-ray intercepting characteristic, and to be transmissible of electromagnetic waves.

When in Formula A, x falls within 0.5–0.8, and (x+y) falls within 0.8–1.2; in Formula B, y falls within 0.2–0.8, and (x+y) falls within 1.4–1.8; and in Formula C, y falls within 0.1–0.8, and (x+y) falls within 1.4–1.8, the window glass of this invention, which includes the heat-ray intercepting film, was compared with a window glass which includes no such film but, as for the rest, is the same as that of this invention. Coordinates a and b of the two window glasses on the Hunter chromaticity plane were examined, respectively, and respective differences $\Delta a$ and $\Delta b$ between the two window glasses were calculated. As the result, it was possible to fall the differences $\Delta a$ and $\Delta b$ within $-5-+5$, and according to observation with the naked eye, there were scarcely any difference between the two window glasses.

Sheet resistivities of the heat-ray intercepting film are $1 k\Omega/\square$ or more, so that respective antennas secured to the window glass of this invention, and loaded in the car to which such window glass is applied will be able to receive well, and radiate or receive well radio waves.

In a preferred embodiment of this invention, the second film has such a thickness as to transmit seventy percent or more of visible light. The thickness of the zirconium, titanium or chromium oxynitride film should be determined upon consideration of the visible-light transmissivity, heat-ray intercepting characteristic and colorific appearance of the window glass. In order to obtain seventy percent of more of the visible-light transmissivity, it is preferable to determine the thickness within a range of 3–15 nm, particularly, 5–10 nm. When the thickness is less than 3 nm, the heat-ray intercepting characteristic becomes not enough, and when it is more than 15 nm, the visible-light transmissivity deteriorates, whereby the window glass is not transparent enough.

Various kinds of sheet glasses can be used for the transparent sheet glass of this invention. For example, colorless sheet glasses or heat-ray intercepting sheet glasses of a bronze, grey or blue color, manufactured under the float process will be usable, and may also be treated under bending and/or tempering processes. The refractive index thereof is about 1.52.

As a material for the transparent resin film for sticking the pair of transparent sheet glasses to each other, it is preferable to use such a resin that the refractive index thereof is the same as that of the transparent sheet glasses. For example, it is preferable to use polyvinyl butyral whose refractive index is about 1.52, because it is excellent for the adhesive force and weatherproofness.

Moreover, in a preferred embodiment of this invention, an antenna conductor is provided on the outer surface of the other of the pair of sheet glasses, or between the inner surface of the other sheet glass and the transparent resin films. In this connection, the reception ability of the antenna conductor does not deteriorate, and the window glass appears nearly achromatic. The antenna conductor may be made, for example, by means of printing and then baking a silver paste on, or securing fine conductive wires to the surface of the sheet glass.

Various coating methods, such as a sputtering, ion-plating or vacuum arc-deposition method, of forming a film after atomizing a material therefor in a low atmospheric pressure are available for forming the heat-ray intercepting film of this invention. Particularly, the sputtering method is very suitable for a laminated glass that is very excellent in a heat-ray intercepting characteristic. The source of the sputtering method may be either direct or high frequency current.

When the zirconium, titanium or chromium oxynitride film is formed by the sputtering method, the targets used for the respective methods are made of zirconium, titanium or chromium, and the atmosphere during sputtering may include nitrogen and oxygen. The ratio between nitrogen and oxygen included in the formed film depends upon the composition and pressure of the atmosphere during sputtering. To stick the pair of transparent sheet glasses to each other with the transparent resin film, various well-known methods are available.

Respective amounts of nitrogen and oxygen in the heat-ray intercepting film of this invention are determined in relation to metals included in the film, so that the window glass is prevented from dazzling reflections of light, and has a high transmissivity of visible light and a high heat-ray intercepting characteristic. Further, if an antenna conductor is secured to the window glass of this invention, the reception ability of the antenna conductor does not deteriorate, because the window glass of this invention has a high electric resistance.

The invention will now be described by way of some examples with reference to the accompanying drawings, throughout which like parts are referred to like references.

DETAILED DESCRIPTION OF PREFERRED EMBODIMENTS

Figure 1:
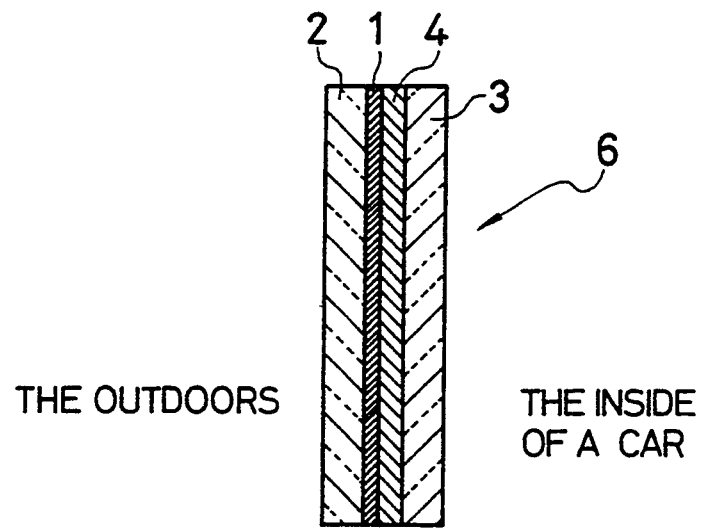
FIGS. 1-3 are fragmentary sectional views of automotive window glasses according to first to third embodiments of this invention, respectively.

Referring initially to FIG. 1, it will be seen that an automotive window glass 6 comprises a pair of transparent sheet glasses: first sheet glass 2 and second sheet glass 3, a heat-ray intercepting film 1 and a transparent resin film 4. The outer surface of the first transparent sheet glass 2 faces the outdoors, and the inner surface thereof is coated with the heat-ray intercepting film 1. The transparent resin film 4 sandwiched between the heat-ray intercepting film 1 and the second transparent sheet glass 3 sticks the second transparent sheet glass 3 to the first transparent sheet glass 2 that is coated with the heat-ray preventing film 1. The outer surface of the second sheet glass faces the inside of a car.

Figure 2:
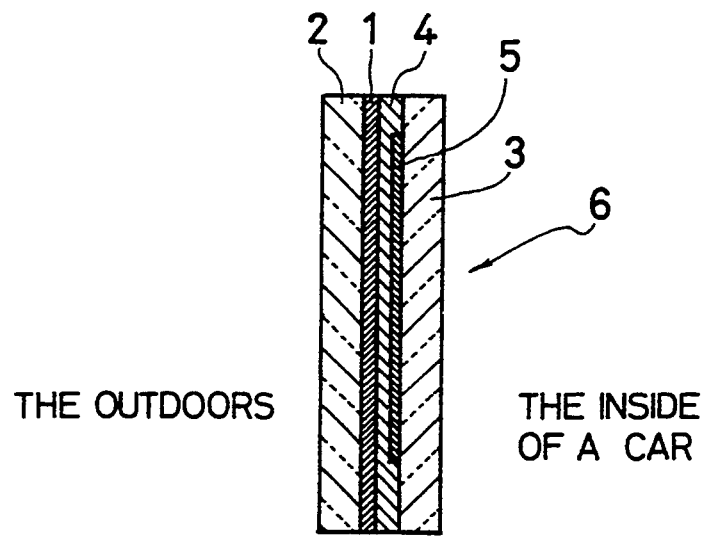
Figure 3:
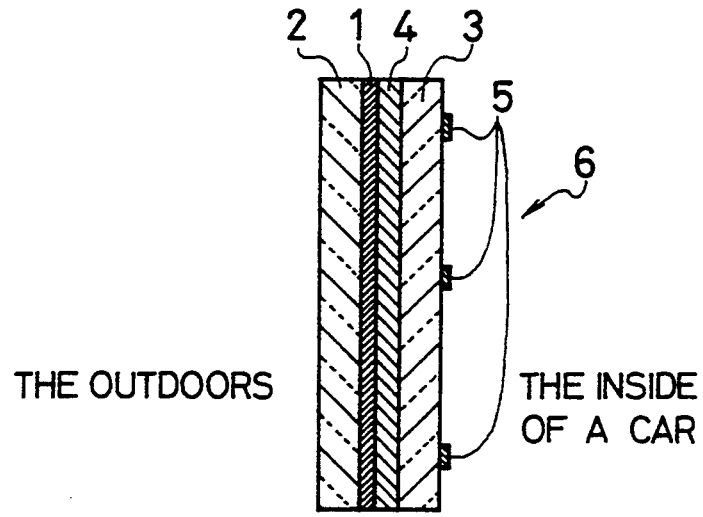
Figure 4:
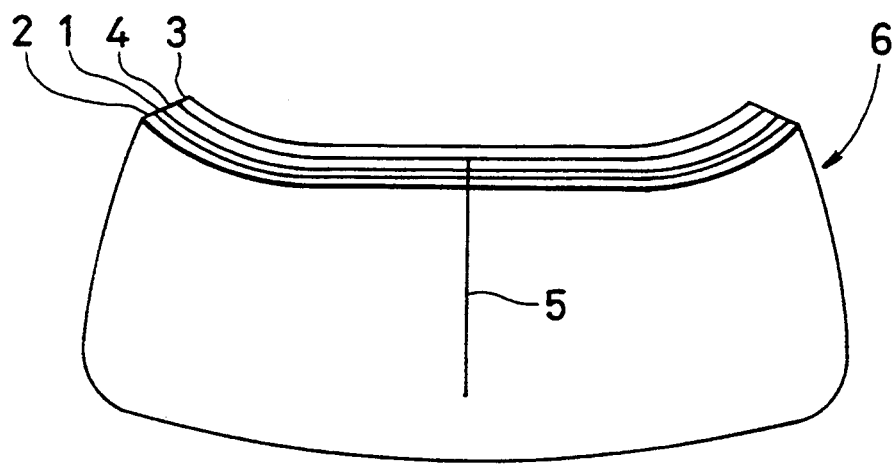
FIG. 4 is a perspective view of the automotive window glass of FIG. 2.

In FIG. 2, the automotive window glass 6 has an antenna conductor 5 between the transparent resin film 4 and the second transparent sheet glass 3, the antenna conductor 5 being made of a fine copper wire that extends vertically downwards along the axis of the window glass 3 as illustrated in FIG. 4. In FIG. 3, the automotive window glass 6 has antenna conductors 5 secured to the outer surface of the second transparent sheet glass 3.

EXAMPLE 1

Both a heat absorbing glass (manufactured by Nippon Sheet Glass Co., Ltd., and sold under the name of "BRONZEPANE"), which is 2.1 mm in thickness, bronze in color, molded in a windshield size of a car and washed, and a 10 cm square of the glass for examining its composition and so forth are placed in a vacuum chamber of a sputtering device, from which air is exhausted to 0.004 Pa.

Then, a mixed gas having a ratio of 100 cc of argon to 180 cc of nitrogen is supplied to the vacuum chamber until its pressure becomes 0.4 Pa. 30 amperes of an electric current are supplied to the target of metallic zirconium to perform sputtering of predetermined duration, and obtain a film of 7 nm thickness on the concave surface of the heat absorbing glass and one surface of the 10 cm square of the glass. The latter is examined with an ESCA analyser, and it becomes clear that the film is of zirconium oxynitride. A result of its quantitative analysis is shown in Table 1.

TABLE 1

Characteristics of Heat-ray Intercepting Films and Application Thereof to Laminated Glasses

| | Heat-ray Intercepting Film | | | | | Laminated Glass | | | | | |
| | | | | | | Transmissivity | | | Reflectivity on the outdoors side | | |
| | | | | | | | | Dif. bet. glasses with and without the film $\Delta Tg$ (%) | Diff. on the Hunter plane | | Diff. on the Hunter plane |
| Test Series | Chemical formula | Atomic ratio x | y | Sheet resistivity ($\Omega/\square$) | Thickness (nm) | Visible light (%) | Solar radiation $Tg$ (%) | | $\Delta a$ | $\Delta b$ | Visible light (%) | $\Delta a$ | $\Delta b$ |
| Ex. 1 | $ZrN_xO_y$ | 0.6 | 0.4 | 3.4k | 7 | 71.5 | 59.6 | 13.2 | −1.2 | 1.5 | 7.9 | 0.4 | −3.1 |
| Ex. 2 | $TiN_xO_y$ | 1.2 | 0.4 | 1.5k | 7 | 71.7 | 59.7 | 13.1 | −1.7 | 2.5 | 7.7 | 0.5 | −3.5 |
| Ex. 3 | $CrN_xO_y$ | 1.2 | 0.4 | 50k | 6 | 70.5 | 62.8 | 10.0 | −1.2 | 1.1 | 8.9 | 0.2 | −2.3 |
| Ex. 4 | $ZrN_xO_y$ | 0.8 | 0.2 | 80k | 9 | 71.0 | 62.3 | 10.5 | −1.4 | 3.6 | 9.5 | 0.2 | −5.1 |

TABLE 1-continued

Characteristics of Heat-ray Intercepting Films and Application Thereof to Laminated Glasses

| | Heat-ray Intercepting Film | | | | Laminated Glass | | | | | | | |
|---|---|---|---|---|---|---|---|---|---|---|---|---|
| | | | | | Transmissivity | | | Reflectivity on the outdoors side | | | | |
| | | | | | | | Dif. bet. glasses with and without the film ΔTg (%) | Diff. on the Hunter plane | | | Diff. on the Hunter plane | |
| Test Series | Chemical formula | Atomic ratio x | Atomic ratio y | Sheet resistivity (Ω/□) | Thickness (nm) | Visible light (%) | Solar radiation Tg (%) | | Δa | Δb | Visible light (%) | Δa | Δb |
| Ex. 5 | $TiN_xO_y$ | 0.9 | 0.7 | 50k | 8 | 70.9 | 59.2 | 13.6 | −2.1 | 4.1 | 8.9 | 0.2 | −3.5 |
| Ex. 6 | $CrN_xO_y$ | 0.8 | 0.8 | 500k | 7 | 70.3 | 63.7 | 9.1 | −1.3 | 2.9 | 9.1 | 0.1 | −3.1 |
| Comp. Ex. 1 | $ZrN_xO_y$ | 0.9 | 0.3 | 500k | 11 | 71.2 | 65.3 | 9.5 | −1.3 | 6.1 | 10.5 | 0.1 | −6 |
| Comp. Ex. 2 | $TiN_xO_y$ | 0.8 | 1.0 | 100k | 10 | 71.8 | 60.8 | 12 | −2.3 | 6.5 | 10.6 | 0.3 | −5.9 |
| Comp. Ex. 3 | $CrN_xO_y$ | 0.5 | 1.1 | >2M | 9 | 70.4 | 66.3 | 8.5 | −1.2 | 6.2 | 8.9 | 0.2 | −4.1 |

Oxygen in the film seems to have been supplied from the gas remained in the vacuum chamber before the sputtering is performed, or from the surface of the heat absorbing glass. It is noted that the sheet resistivity of the film is 3.4 k/Ω/□.

A transparent glass molded in the same size as that of the heat absorbing glass and having a thickness of 2.1 mm is stuck, with polyvinyl butyral, to the surface of the heat absorbing glass, which has been coated with the zirconium oxynitride film, and pressed under the pressure of 15 kg/cm² at temperature of 120° C. in an autoclave. An optical characteristics of a laminated glass thus obtained is also shown in Table 1.

Next, an antenna conductor made of copper is secured to the outer surface of the transparent glass, and various characteristics of the laminated glass: the transmissivity of visible light, the transmissivity of sun light, the reflectivity of visible light, and the difference with a filmless laminated-glass on the Hunter plane are examined and also shown is Table 1.

Moreover, the electromagnetic-wave transmission characteristic of the laminated glass is measured within a range of 1 kHz–1.575 GHz by a method proposed by "Kansai Denshikogyo Shinko Center ( denoted by KEC)", and shown in Table 2.

TABLE 2

Transmissivity Reduction of Electromagnetic Waves (dB)

| Frequency | 1 kHz for AM | 90 MHz for FM | 400 MHz for TV broadcasting | 880 MHz for telephone communications | 1.575 GHz for satellite communications |
|---|---|---|---|---|---|
| Example 1 | ±0 | ±0 | ±0 | ±0 | ±0 |
| Example 2 | ±0 | ±0 | ±0 | ±0 | −0.01 |
| Example 3 | ±0 | ±0 | ±0 | ±0 | ±0 |
| Example 4 | ±0 | ±0 | ±0 | ±0 | ±0 |
| Example 5 | ±0 | ±0 | ±0 | ±0 | ±0 |
| Example 6 | ±0 | ±0 | ±0 | ±0 | ±0 |
| Comp. Ex. 1 | ±0 | ±0 | ±0 | ±0 | ±0 |
| Comp. Ex. 2 | ±0 | ±0 | ±0 | ±0 | ±0 |
| Comp. Ex. 3 | ±0 | ±0 | ±0 | ±0 | ±0 |

It will be seen that is no sensitivity reduction, if the heat-ray intercepting film is used.

EXAMPLE 2

In lieu of metallic zirconium, metallic titanium is used for the target of a magnetron sputtering-device, and by the same method as that used in Example 1 except supplying a mixed gas having a ratio of 100 cc of argon to 500 cc of nitrogen, a film having a thickness of 7 nm is formed on the concave surface of a heat absorbing glass and one surface of a 10 cm square of the glass. The film of the 10 cm square is examined by an ESCA analyser and it becomes clear that the film contains oxygen and is of titanium oxynitride. A result of its quantitative analysis is shown in Table 1. Oxygen in the film seems to have been supplied from the gas remained in the vacuum chamber before the sputtering is performed, or from the surface of the heat absorbing glass. It is noted that the sheet resistivity of the film is 1.5 kΩ/□.

A laminated glass with an antenna conductor is made by the same method as that used in Example 1, and its various characteristics are examined and shown in Tables 1 and 2.

EXAMPLE 3

In lieu of metallic zirconium, metallic chromium is used for the target of a magnetron sputtering-device, and by the same method as that used in Example 1 except supplying a mixed gas having a ratio of 100 cc of argon to 300 cc of nitrogen, a film having a thickness of 6 nm is formed on the concave surface of a heat absorbing glass and one surface of a 10 cm square of the glass. The film of the 10 cm square is examined by an ESCA analyser and it becomes clear that the film contains oxygen and is of chromium oxynitride. A result of its quantitative analysis is shown in Table 1. Oxygen in the film seems to have been supplied from the gas remained in the vacuum chamber before the sputtering is performed, or form the surface of the heat absorbing glass. It is noted that the sheet resistivity of the film is 50 kΩ/□.

A laminated glass with an antenna conductor is made by the same method as that used in Example 1, and its various characteristics are examined and shown in Tables 1 and 2.

EXAMPLE 4

By the same method as that used in Example 1 except supplying a mixed gas having a ratio of 100 cc of argon to 230 cc of nitrogen to a magnetron sputtering device, a film having a thickness of 9 nm is formed on the concave surface of a heat absorbing glass and one surface of a 10 cm square of the glass. The film of the 10 cm square is examined by an ESCA analyser and it becomes clear that the film contains oxygen and is of zirconium oxynitride. A result of its quantitative analysis is shown in Table 1. Oxygen in the film seems to have been supplied from the gas remained in the vacuum chamber before the sputtering is performed, or from the surface of the heat absorbing glass. It is noted that the sheet resistivity of the film is 80 kΩ/□.

A laminated glass with an antenna conductor is made by the same method as that used in Example 1, and its various characteristics are examined and shown in Tables 1 and 2.

EXAMPLE 5

In lieu of metallic zirconium, metallic titanium is used for the target of a magnetron sputtering-device, and by the same method as that used in Example 1 except supplying a mixed gas having a ratio of 100 cc of argon to 300 cc of nitrogen to 1 cc of oxygen, a film having a thickness of 8 nm is formed on the concave surface of a heat absorbing glass and one surface of a 10 cm square of the glass. The film of the 10 cm square is examined by an ESCA analyser and it becomes clear that the film contains oxygen and is of titanium oxynitride. A result of its quantitative analysis is shown in Table 1. It is noted that the sheet resistivity of the film is 50 kΩ/□.

A laminated glass with an antenna conductor is made by the same method as that used in Example 1, and its various characteristics are examined and shown in Tables 1 and 2.

EXAMPLE 6

In lieu of metallic zirconium, metallic chromium is used for the target of a magnetron sputtering-device, and by the same method as that used in Example 1 except supplying a mixed gas having a ratio of 100 cc of argon to 300 cc of nitrogen to 20 cc of oxygen, a film having a thickness of 7 nm is formed on the concave surface of a heat absorbing glass and one surface of a 10 cm square of the glass. The film of the 10 cm square is examined by an ESCA analyser and it becomes clear that the film contains oxygen and is of chromium oxynitride. A result of its quantitative analysis is shown in Table 1. It is noted that the sheet resistivity of the film is 500 kΩ/□.

A laminated glass with an antenna conductor is made by the same method as that used in Example 1, and its various characteristics are examined and shown in Tables 1 and 2.

COMPARATIVE EXAMPLE 1

By the same method as that used in Example 1 except supplying a mixed gas having a ratio of 100 cc of argon to 300 cc of nitrogen, a film having a thickness of 11 nm is formed on the concave surface of a heat absorbing glass and one surface of a 10 cm square of the glass. The film of the 10 cm square is examined by an ESCA analyser and it becomes clear that the film contains oxygen and is of zirconium oxynitride. A result of its quantitative analysis is shown in Table 1. Oxygen in the film seems to have been supplied from the gas remained in the vacuum chamber before the sputtering is performed, or from the surface of the heat absorbing glass. It is noted that the sheet resistivity of the film is 500 kΩ/□.

A laminated glass with an antenna conductor is made by the same method as that used in Example 1, and its various characteristics are examined and shown in Tables 1 and 2.

COMPARATIVE EXAMPLE 2

In lieu of metallic zirconium, metallic titanium is used for the target of a magnetron sputtering-device, and by the same method as that used in Example 1 except supplying a mixed gas having a ratio of 100 cc of argon to 300 cc of nitrogen to 30 cc of oxygen, a film having a thickness of 10 nm is formed on the concave surface of a heat absorbing glass and one surface of a 10 cm square of the glass. The film of the 10 cm square is examined by an ESCA analyser and it becomes clear that the film contains oxygen and is of titanium oxynitride. A result of its quantitative analysis is shown in Table 1. It is noted that the sheet resistivity of the film is 100 kΩ/□.

A laminated glass with an antenna conductor is made by the same method as that used in Example 1, and its various characteristics are examined and shown in Tables 1 and 2.

COMPARATIVE EXAMPLE 3

In lieu of metallic zirconium, metallic chromium is used for the target of a magnetron sputtering-device, and by the same method as that used in Example 1 except supplying a mixed gas having a ratio of 100 cc of argon to 300 cc of nitrogen to 100 cc of oxygen, a film having a thickness of 9 nm is formed on the concave surface of a heat absorbing glass and one surface of a 10 cm square of the glass. The film of the 10 cm square is examined by an ESCA analyser and it becomes clear that the film contains oxygen and is of chromium oxynitride. A result of its quantitative analysis is shown in Table 1. It is noted that the sheet resistivity of the film is 2 MΩ/□.

A laminated glass with an antenna conductor is made by the same method as that used in Example 1, and its various characteristics are examined and shown in Tables 1 and 2.

It will be seen that the respective laminated glasses disclosed in Examples 1–6 can transmit 70% or more of visible light, and have such characteristics that the respective differences $\Delta a$ and $\Delta b$ of the coordinates of the Hunter chromaticity plane between the laminated glasses disclosed in Example 1–6 and the laminated glasses having no heat-ray intercepting film are less than 5, so that the heat-ray intercepting film scarcely influences the color of the laminated glass. Further, it will be seen that the respective laminated glasses with antenna conductors disclosed in Examples 1–6 have the radiowaves transmitting characteristics similar to those having no heat-ray intercepting film.

Having described illustrative embodiments of this invention with reference to the accompanying drawings, it is to be understood that the invention is not limited to that precise embodiments, and that various changes and modifications may be effected therein by one skilled in the art without departing from the scope or spirit of the invention as defined in the appended claims.

What is claimed is:

1. An automotive window glass comprising a pair of transparent sheet glasses and a transparent resin film with which the pair of sheet glasses are stuck together, further comprising a second film sandwiched between one of said pair of sheet glasses and said transparent resin film so as to screen the inside of a car from solar radiation with visible-light reflectivity between 7.7 and 9.5, said second film having any of one of the following compositions represented by chemical formulas whose atomic rates are defined;

(A) $ZrN_xO_y$: $0.5 \leq x \leq 0.8$, and $0.8 \leq x+y \leq 1.2$
(B) $TiN_xO_y$: $0.2 \leq y \leq 0.8$, and $1.4 \leq x+y \leq 1.8$
(C) $CrN_xO_y$: $0.1 \leq y \leq 0.8$, and $1.4 \leq x+y \leq 1.8$ 2. An automotive window glass according to claim 1 in which said second film has such a thickness as to transmit seventy percent or more of visible light.

3. An automotive window glass according to any one of claims 1 and 2 in which an antenna conductor is provided on the outer surface of the other of said pair of sheet classes, or between the inner surface of said other sheet glass and said transparent resin film.

4. An automotive window glass according to claim 1, wherein said second film has a sheet of resistivity which is more than 1 $K\Omega/\square$.

5. An automotive window glass according to claim 1, wherein said second film has a thickness between 3 and 15 nm.

6. An automotive window glass according to claim 1, wherein said automotive window glass and a window glass without said second film have differences on the Hunter chromaticity plane on coordinates a and b, $\Delta a$ being between $-5$ and $+5$, $\Delta b$ being between $-5$ and $+5$.

7. An automotive window glass according to claim 1, wherein said second film has a single layer structure.

* * * * *

UNITED STATES PATENT AND TRADEMARK OFFICE
CERTIFICATE OF CORRECTION

PATENT NO. : 5,336,565
DATED : August 9, 1994
INVENTOR(S) : Takashi MUROMACHI et al.

It is certified that error appears in the above-indentified patent and that said Letters Patent is hereby corrected as shown below:

At column 2, line 57, delete "of" after the word "percent" and replace therefor the word --or--.

At column 5, line 43, after "Table 2" insert the phrase --in comparison with the same one except having no film--.

At column 5, line 61, insert --there-- after the word "that".

At column 7, line 17, delete "1 cc" and insert therefor --10 cc--.

Signed and Sealed this

Ninth Day of July, 1996

Attest:

BRUCE LEHMAN

Attesting Officer

Commissioner of Patents and Trademarks